April 29, 1958
J. G. STARK
2,832,101
PANELED STRUCTURE
Filed July 22, 1955
5 Sheets-Sheet 1
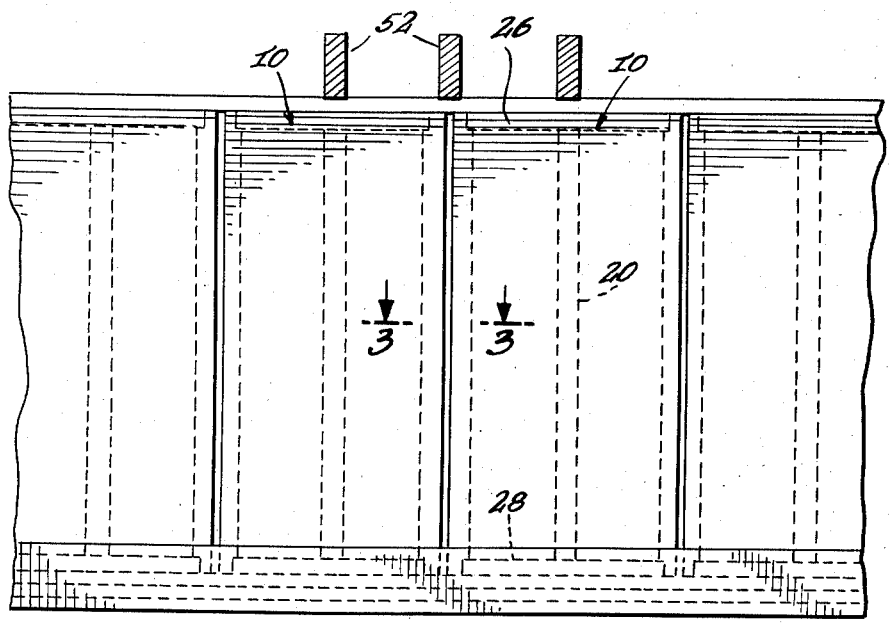
FIG. 1.
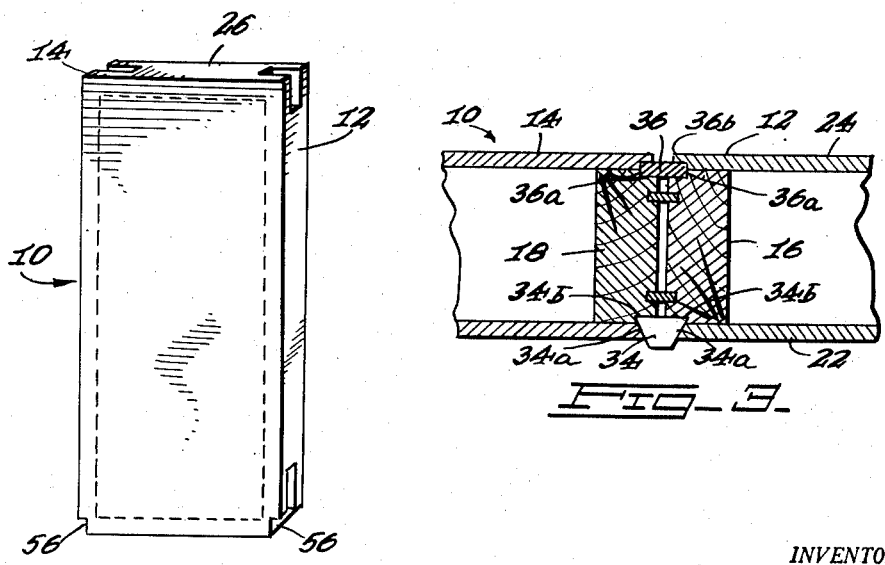
FIG. 2.
FIG. 3.
INVENTOR.
JOSEPH G. STARK.
BY
ATTORNEY.

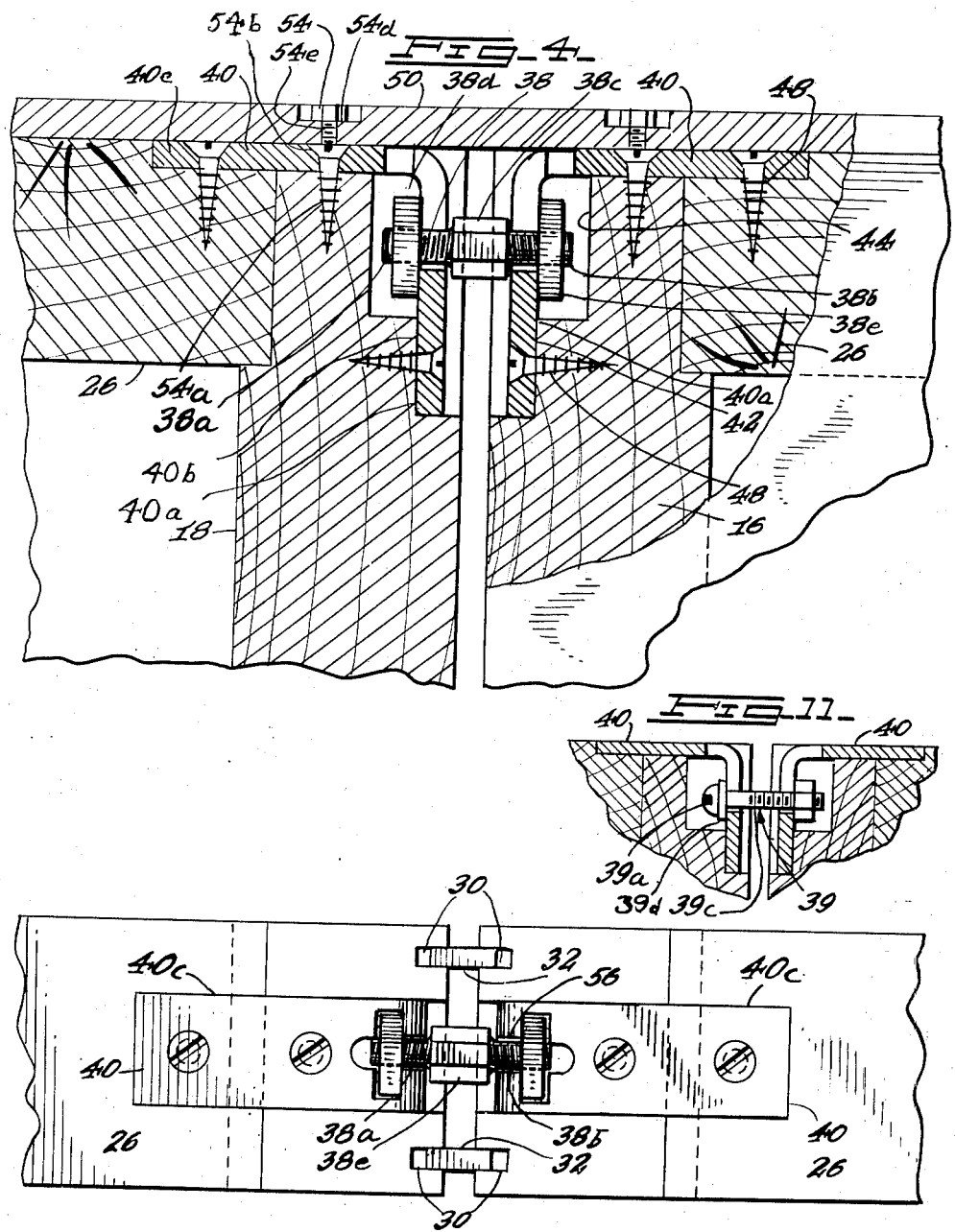

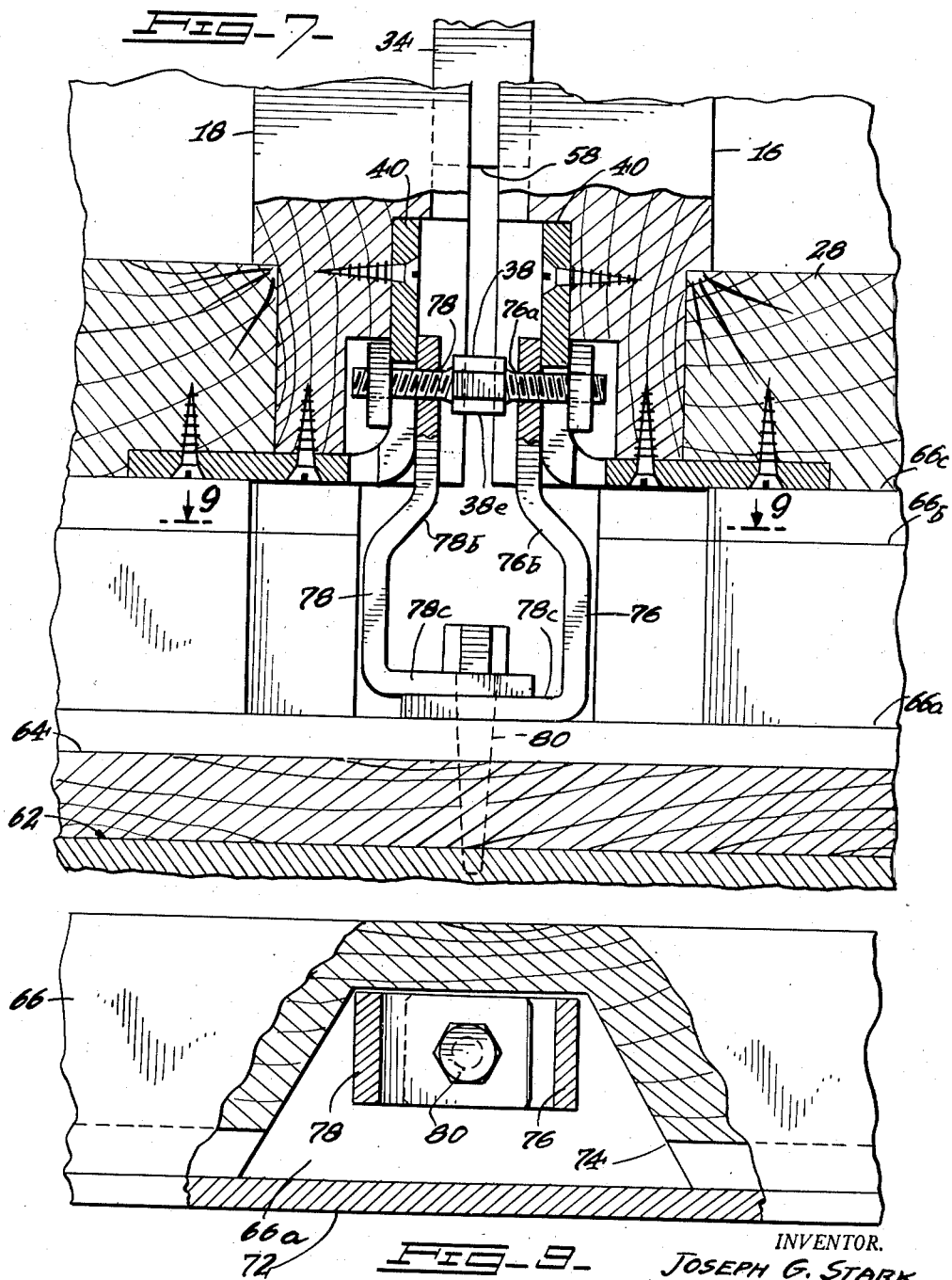

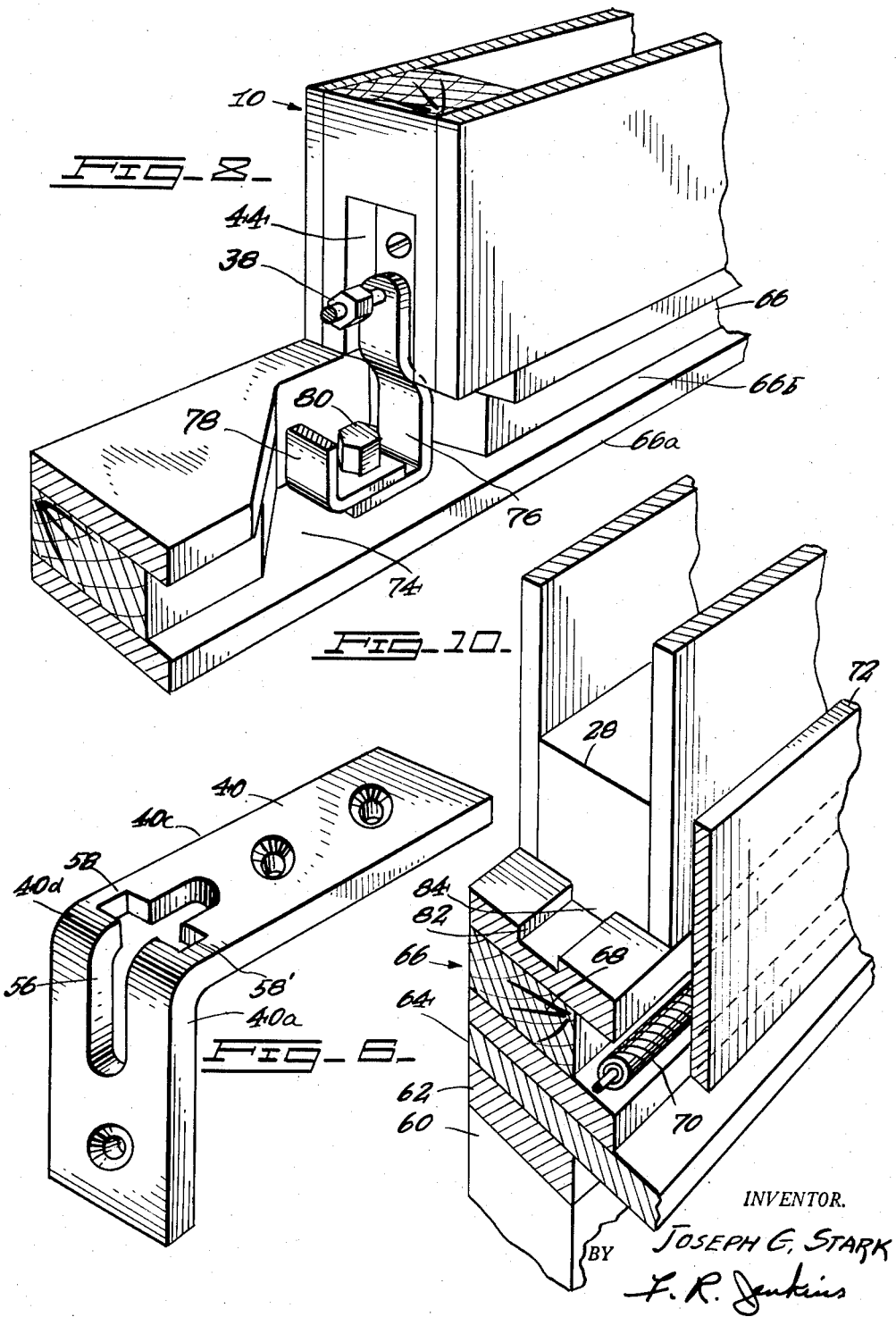

United States Patent Office 2,832,101
Patented Apr. 29, 1958

2,832,101
PANELED STRUCTURE

Joseph George Stark, New York, N. Y., assignor, by mesne assignments, to Lamteck Corporation of America, Irvington, N. Y.

Application July 22, 1955, Serial No. 523,864

12 Claims. (Cl. 20—4)

This invention relates to building structures and more particularly to partially pre-fabricated structures though it will be noted that many features of the invention may be applied to buildings designed primarily for erection by custom or craft procedures.

One object of the invention is to provide a device for joining adjacent panels, such as wall panels, where the lines of juncture must be pleasing to the eye and yet be substantially weatherproof.

Another object is to provide a device which will adequately secure the wall panels to floors or foundations.

Still another object is to provide means for receiving electrical wiring or conduits in such structures and enable easy access to the wiring.

Another object is to provide a means for securing joists and/or rafters to wall sections at joints between panels.

The attainment of these and other objects are accomplished by this invention which, briefly stated, includes a plurality of alined and adjacent wall panels having corner anchor members therein with a bolt connecting adjacent anchor members. The bolt is exposed only sufficiently to be tightened and the upper anchor members may be drawn together by the bolt by rotation of the bolt by a wrench inserted between panels. The bolt at the lower corners carries members for securing the wall panels against upward and lateral movement.

In the accompanying drawing showing, by way of example one of many possible embodiments of the invention, Fig. 1 is a fragmentary front view showing joined panels;

Fig. 2 is a perspective of a panel;

Fig. 3 is a sectional view of a joint between panels, the section being taken along the line 3—3 of Fig. 1, looking in the direction of the arrows of said line;

Fig. 4 is a fragmentary sectional view of a joint at the upper corners of the panels;

Fig. 5 is a top view of a joint at the upper corners;

Fig. 6 is a perspective of the anchor at each corner of the panel;

Fig. 7 is a sectional view showing means for securing the panels to a sill;

Fig. 8 is a fragmentary perspective showing the means of Fig. 7;

Fig. 9 is a sectional view of the means of Fig. 7, the section being taken substantially along the line 9—9 of Fig. 7 looking in the direction of the arrows of said line;

Fig. 10 shows lower portion of the panel in a construction upon a foundation wall;

Fig. 11 shows a modification of the invention; and

Figure 12:
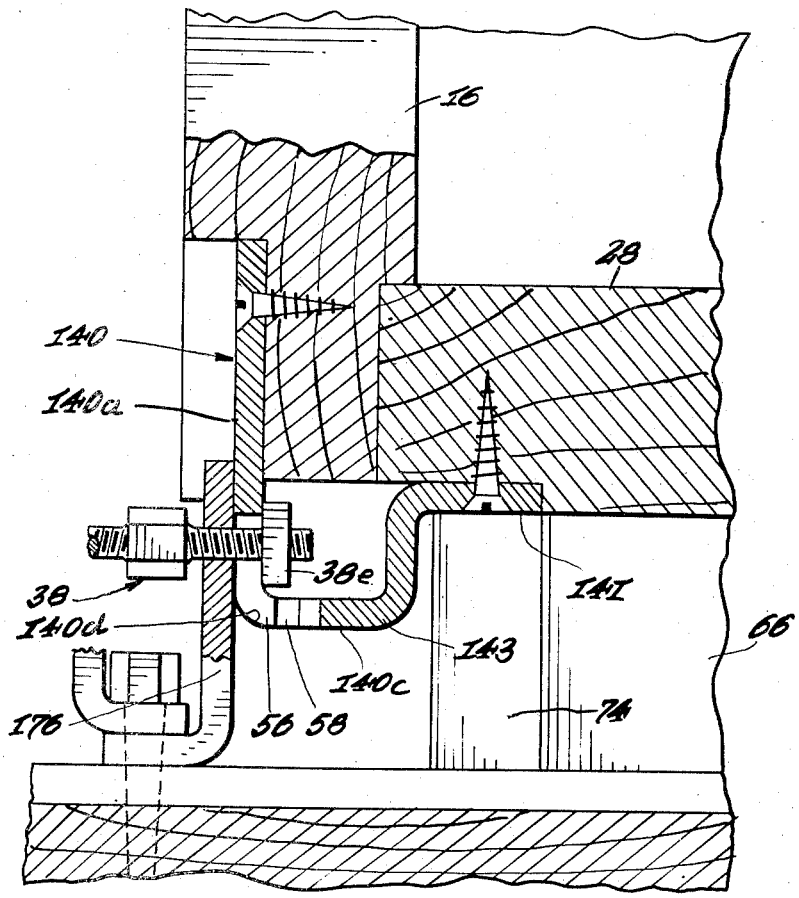
Fig. 12 shows a modification of the anchor.

The invention is shown in connection with a plurality of wall panels 10 of the order of eight or ten feet high and, say, four feet wide having connecting edges 12 and 14 for facile assembly. Each panel includes two edge studs or stiles designated 16 and 18 respectively and preferably at least one intermediate stud 20 onto which are secured inner and outer sheets 22 and 24 of conventional material such as plywood, cellulose composition board, gypsum or any known sheeting material suitable under the prevailing conditions where a wall is desired. To add strength it is preferable to add upper and lower rail members 26 and 28 to join the stiles.

To keep adjacent panels flush with each other and for assistance during their erection I provide the stiles with grooves 30, into which are disposed strips or tongues 32, running from top to bottom. The tongues may be adhered to the stiles or may be left free but preferably each tongue is adhered to one stile.

For sealing the panels at abutting edges I employ sealing strips such as 34 and/or 36 (Fig. 3) depending on the nature of the exposure and the desired appearance. The strip 34 is somewhat trapezoidal in cross section and is disposed between beveled edges 34a undercut on the wall sheeting 22 along the vertical edges of the left and right sides of the panels. The respective stiles 16 and 18 are provided with undercut rabbet grooves 34b so that when the panel edges are drawn together, by means described in detail below, the strip 34 substantially fills the grooves 34b and space between the wall sheets at the beveled edges 34a. The sealing strip 36 is rectangular in cross section and lies between simple rabbet grooves 36a in the stiles and reverse cut rabbets 36b in the wall sheet 24. The sheets 24 do not meet over the strip 36.

The panels are drawn into abutting position by means of a bolt 38 having right hand threads at one end 38a and left handed threads at the other end 38b cooperating with symmetrically disposed right angular strap anchor 40 at the corners of the panels. The joint at the upper corners is shown in Figs. 4 and 5 wherein each stile is provided with a recess 42 sufficiently deep (to the right in stile 18 of Fig. 4) to receive the vertical leg 40a of the anchor 40 and to allow space for the wrench engaging portion 38c of the bolt between the adjacent vertical legs 40a when the stiles are drawn tight against the tongues or guides 32, 34 or 36. An additional recess 44 within the recess 42 is provided to receive the bolt ends 38a and 38b and their nuts 38d and 38e, the latter engaging on the inner faces 40b of the vertical legs. Both recesses are upwardly open.

The anchor is secured to the panel by means of screws 48 passing through the vertical leg and into the stile 16 and through the horizontal leg 40c into the rail 26. A top plate 50 is disposed over a row of panels as a means for mounting joists or rafters 52 (Fig. 1). In order that the top plate be secured as nearly directly to the stiles or studding, I employ a screw 54 having wood threads 54a and head 54b passing through the leg 40c and down into the stile while above the head there are threads 54c onto which a nut 54d is threaded for holding down the top plate.

During course of erection, the two panels are brought together in approximate alinement and fitted together with the aid of the tongues or strips 32 and with the anchors in approximate position and secured on the panels. In order to permit the proper disposition of the bolt 38 with its nuts 38d and 38e, I have provided each anchor with a longitudinal slot 56 in the corner 40d of the anchor with the slot extending into the two legs as shown in Fig. 6. Two lateral slots 58 and 58' in the leg 40c open into the slot 56 above the stile recess 44. With this arrangement, the bolt ends 38a and 38b may be dropped into the slots 56 of the two anchors with the nuts 38d and 38e passing through the transverse slot and at corners of the nut will engage the leg 40c. The transverse slot 58—58' is preferably slightly remote from the inner face 40b of the vertical leg, so that the nut engages the horizontal leg and is prevented from turning.

After the bolt is so disposed it is tightened by a thin shanked wrench, inserted between the stiles from above, until the stiles bear firmly against the srips or tongues 32, 34, 36. The top plate or runner 50 is then secured by screws and nuts 54—54d.

A bolt 39 (Fig. 11) having only one nut and a head 39a may be used and rotated by a pipe wrench engaging its shank or mid portion 39c. A washer 39d, which may be of the same size and shape as the nut 38d, is on the head end portion.

For joining the panels at the bottom corners the same elements are used as are used at the top but the same access to the bolt 38 is not afforded. To overcome this difficulty I may provide at the lower, say, inside corners, cut-outs 56 (Fig. 2) which substantially expose the bolt and anchors to the interior of the structure to be built from the panels and I terminate the guides, tongues or strips 32, 34 short of the bolt zone as at 58 so as to permit access to the bolt. Securement of the panels to prevent their being lifted up is described next below.

The structure built includes a conventional foundation wall 60, sill piece 62 secured thereon and a floor 64, preferably of plywood panels secured upon the sill piece. Secured on the floor and over the sill, is a panel support or base rail 66 running in the direction of the sill piece 62. The width of the base rail is about equal to the thickness of the panels.

The base rail 66 is preferably composite and consisting of a bottom strip 66a, a thick mid-member 66b and a top strip 66c all secured together, as by an adhesive or nails (not shown). The mid-member is not quite as wide as the top and bottom strips and provides a channel or raceway 68 in which conduits or cables 70 may be disposed. The raceway and cable are covered by a base board 72.

The base rail is provided with an inwardly open notch 74 beneath a joint in the panels. The notch is upwardly open and long enough to permit the erector to dispose the bolt by hand, upwardly into the longitudinal slots and in a manner similar to that described of the top connection.

For tying the corner to the floor or sill I employ a pair of substantially L-shaped foot members 78—76, of say, iron strap, depending in the notch from the bolt 38 which passes through holes 78a, 76a in the vertical end portions 78b, 76b each disposed between an anchor and the wrench engaging portion 38c of the bolt. Since the foot members must be accommodated at the lower corners of the panels the recesses 44 must be deeper at the lower corners than is necessary at the upper panel corners. Each member 78 and 76 is provided with an inwardly directed foot-part 78c, 76c respectively, one overlapping the other.

A lag screw 80 passing through the foot parts, and engaged tightly into the bottom strip 66a, the floor 64, and the sill 62, holds the panels to the foundation. The foot parts 76c, 78c may be integral thereby making the pair of foot members a U member in fact. However, for easy manipulation of the bolt into place, the separate members are desired.

For alining the panels and for giving continuous lateral strength the top strip 66c may be provided with a longitudinal groove 82, and the bottom panel rail 28 with a tongue 84 as shown in Fig. 10.

The bottom strip 66a may be omitted from the support rail 66, with loss of strength, in which case the foot members might engage the floor 64, and the raceway 68 might be omitted. The base board 72 extends upwardly, sufficiently to cover the cut-outs 56 and give the lower portion of the panels a finished appearance.

A modified anchor 140 especially for use at lower panel corners is shown in Fig. 12, generally similar to Fig. 7 except for symmetry. The anchor 140 differs from anchor 40 largely in that the horizontal leg 140c of the form is provided with an upwardly offset terminal end portion 141 which is secured to the bottom panel rail 28. This construction or shape produces a loop 143 which may project downwardly into the notch 74 of the base rail 66, and so facilitate the entry of the bolt 38 and its nut 38c into the slots 56, 58 provided at the anchor corner 140d as described of anchor 40. Since the loop 143 extends lower than any part when anchor 40 is used, the vertical leg 140a of anchor 140 may be longer than leg 40a. Anchor 140 permits the use of a lower base board since cut-outs 56 in the panels may be omitted.

Foot members 176 used for securing the panels to the floor are similar to the foot members 76 except for the omission of the off-set 76b on the latter as space requirements demand.

I claim as my invention:

1. In combination, a pair of adjacent co-planar rectangular panel members; a pair of L-shaped anchor members secured to respective adjacent corner portions of the panels and each having legs lying in mutually perpendicular planes and extending in the direction of the plane of the panels, each anchor member having a longitudinal slot at the corner portion thereof and extending in the direction of the plane of the panels and a transverse slot intersecting the longitudinal slot; and a bolt having opposite end portions disposed in the respective longitudinal slots.

2. In a combination as in claim 1, said bolt being oppositely threaded at the opposite ends.

3. In combination an anchor of substantially L-shape having strip-like legs lying substantially in perpendicular planes, the anchor having a longitudinal slot extending into both legs and in a direction perpendicular to both of said planes, one of the legs having a slot at right angles to the longitudinal slot and opening thereinto; and a panel member having both legs secured thereto.

4. In a structure as claimed in claim 1 said panel members each having co-planar wall sheets, having undercut grooves at adjacent edge portions, and a strip disposed in said grooves and sufficiently wide to prevent said panels from touching each other.

5. In a housing structure, a pair of rectangular panel members disposed edge-to-edge adjacent each other; corner anchors at adjacent corners of the respective panel edges and each consisting of a right angularly bent strip having vertical and horizontal legs secured to the corner portion of the panel, the legs extending in the general plane of the panel; said anchor being provided with a longitudinal slot at the bend thereof and extending into each of said legs; a bolt having one end thereof in the slot of one anchor and the other in the slot of the other anchor; a nut on said end of the bolt one horizontal leg being provided with opposite slots transverse to and opening into its longitudinal slot for passing the nut through the horizontal leg when the bolt with nut thereon is being disposed in the longitudinal slots; said panel corner portions being provided with a recess inward of the said opposite slots to receive the bolt ends.

6. In a housing structure, a pair of rectangular panel members disposed edge-to-edge adjacent each other; corner anchors at adjacent corners of the respective panel edges and each consisting of a right angularly bent strip having vertical and horizontal legs secured to the corner portion of the panel, the legs extending in the general plane of the panel; said anchor being provided with a longitudinal slot at the bend thereof and extending into each of said legs; a bolt having one end in the slot of one anchor and the other in the slot of the other anchor; restraining parts on the respective ends of the bolt and rotatable thereon; each horizontal leg being provided with opposite slots transverse to and opening into the longitudinal slot for passing the parts through the horizontal legs when the bolt with parts thereon is being disposed in the longiudtinal slots; said panel corner portions being provided with a recess inward of the said opposite slots to receive the parts.

7. In a housing structure, a pair of rectangular panel members disposed edge-to-edge adjacent each other; corner members at adjacent lower corners of the respective edges and each consisting of a right angularly bent strip having vertical and horizontal legs secured to the corner portion of the panel, the legs extending in the general plane of the panel; said anchor being provided with a longitudinal slot at the bend thereof and extending into each of said legs; a horizontal bolt having one end in the slot of one anchor and the other in the slot of the other anchor; restraining parts on the bolt for preventing downward motion of the bolt; a support member beneath the panel members; and tie means pending from the bolt for securing the panel members to the support member in substantially fixed relationship thereto.

8. In combination, a support; vertical panel members above the support; a horizontally disposed bolt at lower corners of the panel members joining one panel member to another at a vertical edge thereof; a tie member pending from the bolt and between the panel members for securing the bolt fast with respect to the support said tie member including an L-shaped piece having the bolt passing through one leg, a spacing member between the support and panels and provided with a laterally open notch, a part of the tie member being in the notch, and screw means passing through the other leg of the piece into the support.

9. A coupling device comprising a pair of corner anchors and each consisting of a right angularly bent strip having vertical and horizontal legs, the horizontal legs extending in the same general plane; said anchor being provided with a longitudinal slot at the bend thereof and extending into each of said legs; each horizontal leg being provided with opposed slots transverse to and opening into the longitudinal slot; and a bolt having opposite end portions thereof in the respective longitudinal slots.

10. A device as claimed in claim 9, said bolt having oppositely threaded end portions.

11. A panel anchor comprising a bent strip having first and second leg members meeting at a common corner and lying in mutually perpendicular planes, the anchor being provided with a longitudinal slot extending into the two members, the first member being provided with transverse slots at a finite distance from the corner and opening into the longitudinal slot.

12. An anchor as claimed in claim 11, the first member having a terminal portion offset in the direction in which first member extends from the corner.

References Cited in the file of this patent

UNITED STATES PATENTS

| | | |
|---|---|---|
| 417,313 | De Haven | Dec. 17, 1889 |
| 571,042 | Edquist | Nov. 10, 1896 |
| 885,524 | Robinson | Apr. 21, 1908 |
| 1,257,097 | Morris | Feb. 19, 1918 |
| 1,372,206 | Stadelman | Mar. 22, 1921 |
| 2,129,497 | Horn | Sept. 6, 1938 |
| 2,316,980 | Sigloch et al. | Apr. 20, 1943 |
| 2,319,245 | Lunken et al. | May 18, 1943 |
| 2,732,044 | McClune | Jan. 24, 1956 |